US008194299B2

(12) United States Patent
Yamashita et al.

(10) Patent No.: US 8,194,299 B2
(45) Date of Patent: Jun. 5, 2012

(54) IMAGE FORMING APPARATUS AND IMAGE QUALITY ADJUSTMENT METHOD OF IMAGE FORMING APPARATUS (75) Inventors: Daisuke Yamashita, Shizuoka (JP); Takeshi Watanabe, Kanagawa (JP)

(73) Assignees: Kabuhsiki Kaisha Toshiba, Tokyo (JP); Toshiba Tec Kabuhsiki Kaisha, Tokyo (JP)

( * ) Notice: Subject to any disclaimer, the term of this patent is extended or adjusted under 35 U.S.C. 154(b) by 865 days.

(21) Appl. No.: 12/255,351

(22) Filed: Oct. 21, 2008

(65) Prior Publication Data

US 2009/0128870 A1    May 21, 2009

Related U.S. Application Data (60) Provisional application No. 60/988,368, filed on Nov. 15, 2007.

(51) Int. Cl.
  *G03F 3/08*  (2006.01)
  *H04N 1/60*  (2006.01)
  *G06K 9/00*  (2006.01)

(52) U.S. Cl. ........................ 358/521; 358/1.9; 382/165

(58) Field of Classification Search .................. 358/1.9, 358/521, 518, 519, 504, 520, 530; 382/167, 382/162, 165
See application file for complete search history.

(56) References Cited

U.S. PATENT DOCUMENTS

| | | | | |
|---|---|---|---|---|
| 5,585,927 A * | 12/1996 | Fukui et al. | ................ | 358/518 |
| 5,754,683 A * | 5/1998 | Hayashi et al. | ................ | 382/167 |
| 5,856,876 A * | 1/1999 | Sasanuma et al. | ................ | 358/300 |
| 7,499,197 B2 * | 3/2009 | Seki et al. | ................ | 358/3.01 |
| 7,529,006 B2 * | 5/2009 | Itagaki et al. | ................ | 358/519 |
| 7,545,536 B2 * | 6/2009 | Hayashi | ................ | 358/1.9 |
| 7,652,790 B2 * | 1/2010 | Touura | ................ | 358/1.9 |
| 7,852,532 B2 * | 12/2010 | Oki | ................ | 358/519 |
| 7,898,691 B2 * | 3/2011 | Saito et al. | ................ | 358/3.03 |
| 8,077,351 B2 * | 12/2011 | Kobashigawa | ................ | 358/1.9 |
| 2004/0160618 A1 * | 8/2004 | Nogiwa | ................ | 358/1.9 |
| 2004/0246545 A1 * | 12/2004 | Touura | ................ | 358/521 |
| 2005/0219663 A1 * | 10/2005 | Yamada et al. | ................ | 358/521 |
| 2007/0133058 A1 * | 6/2007 | Seki et al. | ................ | 358/3.01 |
| 2007/0236760 A1 * | 10/2007 | Oki | ................ | 358/519 |
| 2007/0247680 A1 * | 10/2007 | Nakane et al. | ................ | 358/521 |

FOREIGN PATENT DOCUMENTS

JP    2000-238341    9/2000

* cited by examiner

*Primary Examiner* — Madelein A Nguyen
(74) *Attorney, Agent, or Firm* — Turocy & Watson, LLP (57) ABSTRACT A reading section outputs density information of a gradation pattern image of a recording member. A gradation correction characteristic generation section generates a first gradation correction characteristic f(x). At first image quality adjustment, a detection section detects densities of patch pattern images on an image carrier, and the gradation correction characteristic generation section generates a second gradation correction characteristic g(x). At normal image quality adjustment, the detection section detects densities of patch pattern images on the image carrier, and the gradation correction characteristic generation section generates a second gradation correction characteristic g'(x). A calculation section calculates a difference gradation correction characteristic g"(x) between the gradation correction characteristic g(x) and the second gradation correction characteristic g'(x). An image quality maintaining control section multiplies the difference gradation correction characteristic g"(x) by the first gradation correction characteristic f(x), and adjusts an image quality of an image formed on the recording member.

20 Claims, 10 Drawing Sheets

IMAGE FORMING APPARATUS AND IMAGE QUALITY ADJUSTMENT METHOD OF IMAGE FORMING APPARATUS

CROSS-REFERENCE TO RELATED APPLICATION

The present application claims priority under 35 U.S.C. 119 to U.S. Provisional Application Ser. No. 60/988,368, entitled Image Quality Adjustment Method of Image Forming Apparatus and Image Forming Apparatus with Image Quality Adjustment Function, to Yamashita et al., filed on Nov. 15, 2007, the entire disclosure of which is incorporated herein by reference.

TECHNICAL FIELD

The present invention relates to an image forming apparatus with an image quality adjustment function and an image quality adjustment method of an image forming apparatus.

BACKGROUND

In recent years, a request to an image forming apparatus for high image quality is getting higher. Besides, a color image forming apparatus becomes widespread. The color image forming apparatus, for example, an electrophotographic apparatus sequentially superposes toners of, for example, four colors of Y (Yellow), M (Magenta), C (Cyan) and K (Black) on a transfer target body and expresses a full-color image on the transfer target body. When a gradation property is changed between the colors of the respective toners even if only slightly, the tint of a final image is changed. It is important to keep the gradation property constant against the deterioration with age of the image forming apparatus or environmental change. Then, in order to keep the gradation property, various image quality maintaining control methods are investigated.

As a generally used image quality maintaining control method for keeping the gradation property, the following method can be mentioned. First, a scanner or the like as an original document reading apparatus reads a specific pattern, such as a gradation pattern, printed on a paper or the like as a print member. The scanner or the like holds the read information as reference density. After a certain period of time, an image forming section prints the specific pattern such as the gradation pattern. The scanner or the like again reads the specific pattern. An image processing section compares the read information with the reference density and determines a correction coefficient. The image processing section causes the correction coefficient to be fed back to the image forming section.

However, in the above method, when the image forming apparatus is used for a long period of time, there is a problem that even if the image processing section executes the image quality maintaining control, the read density does not reach the reference density. When the image processing section executes the image quality maintaining control, the scanner or the like must always be used. There is a problem that it takes much time to execute the image quality maintaining control or handling by a person is complicated.

Then, a control method of an image processing apparatus is proposed in which a change in toner density value on a photoconductive drum from a reference density value is examined, a correction table is formed from the change amount, the correction table and a lookup table for converting a density signal into a laser output signal are combined into one table, and γ correction is performed (for example, JP-A-2000-238341).

JP-A-2000-238341 discloses a method described below. A first control system of an image processing apparatus performs an automatic gradation correction in which an image on a recording member recording a specified image is read, and a laser output relative to an image signal is controlled so that the gradation of the image signal coincides with the gradation of the image recorded on the recording member (Act 271). Immediately after that, a second control system of the image processing apparatus forms a patch on the photoconductive drum by the laser output controlled in the first control process, and detects the density value of the patch (Act 274).

Thereafter, for example, when the power source of the image forming apparatus is turned ON, the second control system detects the density value of the patch formed on the photoconductive drum at a specified timing (Act 277), and forms a correction LUT for controlling the laser output relative to the image signal so that the detected density value coincides with the reference density value (Act 278).

In the image processing apparatus disclosed in JP-A-2000-238341, after the second control system reads the patch, the correction table is formed, the laser output is controlled based on the correction table, and the reference density is determined. However, in the image processing apparatus, it takes much time to perform the image quality maintaining control operation as before. Besides, since the laser output is determined based on the correction table, in the patch pattern for each color formed when the reference density is formed, the input value varies at each time of correction. It can be inconvenient to obtain the gradation property.

SUMMARY

In an aspect of the present invention, an image forming apparatus includes an image forming section to form an image having gradation on an image carrier based on image data, a gradation pattern generation section to generate image data of a gradation pattern, a reading section to read a gradation pattern image from a recording member on which the gradation pattern image of the image data of the gradation pattern generated by the gradation pattern generation section is formed and to output density information of the gradation pattern image, a detection section to detect densities of patch pattern images formed on the image carrier by the image forming section based on image data of plural patch patterns generated from fixed values, a gradation correction characteristic generation section that generates a first gradation correction characteristic $f(x)$ based on the density information outputted by the reading section and a previously held target gradation characteristic, stores the first gradation correction characteristic $f(x)$ in a storage section, generates a gradation characteristic from the densities detected by the detection section, generates a second gradation correction characteristic $g(x)$ from the gradation characteristic, and stores the second gradation correction characteristic $g(x)$ in the storage section, a calculation section that reads the second gradation correction characteristic $g(x)$ generated by the gradation correction characteristic generation section at initial image quality adjustment and the second gradation correction characteristic $g'(x)$ generated by the gradation correction characteristic generation section at normal image quality adjustment from the storage section, and calculates a difference gradation correction characteristic $g''(x)$ as a difference between the gradation correction characteristic $g(x)$ and the second gradation correction characteristic g'(x), and an image quality maintaining control section that multiplies the difference gradation correction characteristic g"(x) calculated by the calculation section by the first gradation correction characteristic f(x) stored in the storage section, and performs gradation correction on the image data inputted to the image forming section based on a gradation correction characteristic obtained by multiplication.

DETAILED DESCRIPTION

Throughout this description, the embodiments and examples shown should be considered as exemplars, rather than limitations on the apparatus and methods of the present invention.

Hereinafter, a method and an apparatus will be described in detail with reference to the accompanying drawings. Incidentally, in the respective drawings, the same portions are denoted by the same reference numerals, and their duplicate description will be omitted.

First Embodiment

Figure 1:
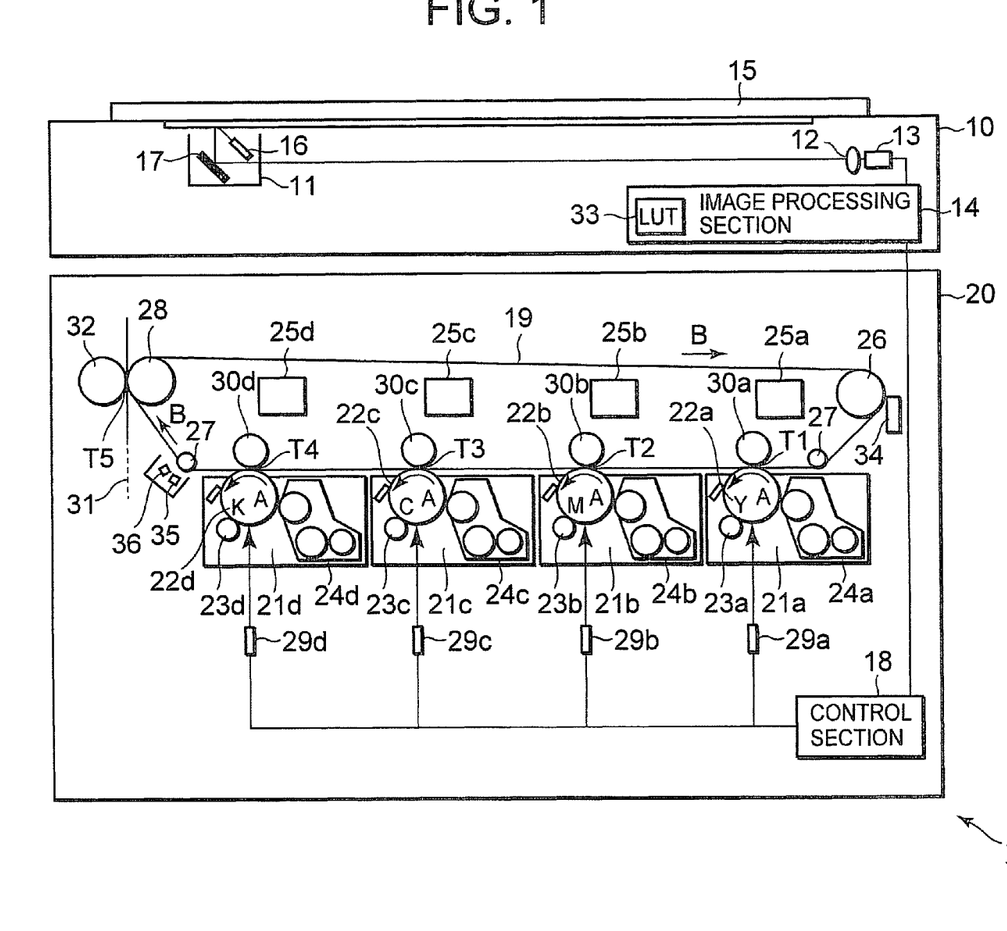
FIG. 1 is a view showing an example of a structure of a color copier.

An image forming apparatus of a first embodiment is a color copier. FIG. 1 is a view showing an example of a structure of a color copier. A color copier 1 includes an image reading section 10 (reading section) and an image forming process section 20.

The image reading section 10 is a scanner to scan an original document and to output read image data. The image reading section 10 includes an original document illumination unit 11 horizontally movable, an imaging lens 12 disposed on an optical path of a reflected light from the original document illumination unit 11, and a CCD (Charge Coupled Device) 13 to receive the reflected light imaged by the imaging lens 12.

The original document illumination unit 11 includes a transparent platen glass 15 on which an original document is placed, a light source 16 to output light to be irradiated to the original document, and a reflecting mirror 17 to reflect the light reflected by the original document.

Besides, the image reading section 10 includes an image processing section 14. The image processing section 14 converts an output signal from the CCD 13 into image data of yellow (Y), magenta (M), cyan (C) and black (K), performs a processing, such as density correction, on the converted data, and outputs resultant data as writing image data.

The image processing section 14 includes an MPU (Micro Processing Unit), a ROM (Read Only Memory) and a RAM (Random Access Memory). The image processing section 14 includes an LUT (Look-Up Table) 33 to store data such as a gradation correction characteristic obtained by after-mentioned calculation.

The image processing section 14 functions as a gradation pattern generation section to generate image data of gradation patterns.

The image processing section 14 functions as a gradation correction characteristic generation section. The image processing section 14 has a function to generate a first gradation correction characteristic f(x) based on density information and a previously held target gradation characteristic and to store the first gradation correction characteristic f(x) in a storage section, and a function to generate a gradation characteristic from density, to generate a second gradation correction characteristic g(x) from the gradation characteristic, and to store the second gradation correction characteristic g(x) in the storage section.

The image processing section 14 functions as a calculation section. The image processing section 14 calculates a difference between the second gradation correction characteristic g(x) generated by the gradation correction characteristic generation section at initial image quality adjustment and the second gradation correction characteristic g'(x) generated by the gradation correction characteristic generation section at normal image quality adjustment, and outputs a difference gradation correction characteristic g"(x).

The image processing section 14 functions as an image quality maintaining control section. The image processing section 14 multiplies the difference gradation correction characteristic g"(x) by the first gradation correction characteristic f(x), and performs gradation correction on the image data based on a gradation correction characteristic obtained by the multiplication.

The image formation process section 20 charges an image carrier, and exposes the surface of the image carrier to form an electrostatic latent image. The image formation process section 20 forms a toner image from the electrostatic latent image, and transfers the toner image to an intermediate transfer body. The image formation process section 20 controls the charging, development, and transfer of the image carrier. Control signals and image data are exchanged between the image reading section 10 and the image formation process section 20.

The image formation process section 20 includes an image forming section 21a for yellow, an image forming section 21b for magenta, an image forming section 21c for cyan, an image forming section 21d for black, and a control section 18. The control section 18 converts the writing image data outputted from the image processing section 14 into data of four print colors and outputs it. The control section 18 includes an MPU, a ROM, a RAM, and an LSI (Large Scale Integration).

The image forming section 21a includes a photoconductive drum 22a that rotates in an arrow A direction and is an image carrier, a charging roller 23a that is provided around the photoconductive drum 22a and uniformly charges the surface of the photoconductive drum 22a, a laser exposure section 29a that includes a not-shown laser light source, modulates a laser light according to the writing image data inputted from the control section 18 and irradiates it to the photoconductive drum 22a, a developing unit 24a that contains yellow toner, and a drum cleaner 25a to remove a residual toner on the photoconductive drum 22a.

The image forming section 21b includes a photoconductive drum 22b, a charging roller 23b to uniformly charge the surface of the photoconductive drum 22b, a laser exposure section 29b that modulates a laser light according to the writing image data from the control section 18 and irradiates it to the photoconductive drum 22b, a developing unit 24b that contains magenta toner, and a drum cleaner 25b to remove a residual toner on the photoconductive drum 22b.

The image forming section 21c includes a photoconductive drum 22c, a charging roller 23c to uniformly charge the surface of the photoconductive drum 22c, a laser exposure section 29c that modulates a laser light according to the writing image data from the control section 18 and irradiates it to the photoconductive drum 22c, a developing unit 24c that contains cyan toner, and a drum cleaner 25c to remove a residual toner on the photoconductive drum 22c.

The image forming section 21d includes a photoconductive drum 22d, a charging roller 23d to uniformly charge the surface of the photoconductive drum 22d, a laser exposure section 29d that modulates a laser light according to the writing image data from the control section 18 and irradiates it to the photoconductive drum 22d, a developing unit 24d that contains black toner, and a drum cleaner 25d to remove a residual toner on the photoconductive drum 22d.

As an example of the intermediate transfer body, the intermediate transfer belt 19 is provided to contact with the respective surfaces of the photoconductive drums 22a to 22d. The image formation process section 20 includes a drive roller 26 rotated and driven by a not-shown drive source, a pair of tension rollers 27 disposed to be separate from each other, and a backup rollers 28 for secondary transfer. The pair of tension rollers 27 makes a tensile force exerting on the intermediate transfer belt 19 constant. The intermediate transfer belt 19 is given the tensile force by the drive roller 26, the pair of tension rollers 27, and the backup roller 28. The intermediate transfer belt 19 runs in an arrow B direction.

The intermediate transfer belt 19 contacts with the photoconductive drums 22a, 22b, 22c and 22d at four primary transfer positions T1, T2, T3 and T4. Primary transfer rollers 30a, 30b, 30c and 30d are provided which are respectively opposite to the photoconductive drums 22a, 22b, 22c and 22d across the intermediate transfer belt 19. Forces directed toward the photoconductive drums 22a, 22b, 22c and 22d are applied to the primary transfer rollers 30a, 30b, 30c and 30d in a state where they are in contact with a surface of the intermediate transfer belt 19 opposite to the surface on which the toner is carried.

The intermediate transfer belt 19 confronts a planar path along which a paper 31 is conveyed at a secondary transfer position T5. At the secondary transfer position T5, a secondary transfer roller 32 is provided at the side of the surface (outside surface) of the intermediate transfer belt 19 on which the toner is carried. The secondary transfer roller 32 can contact with the intermediate transfer belt 19, and can be separated from the intermediate transfer belt 19.

At the secondary transfer position T5, the backup roller 28 is positioned at the back side (inner side) of the surface of the intermediate transfer belt 19 on which the toner is carried. The backup roller 28 functions as an electrode opposite to the secondary transfer roller 32.

The drive roller 26 is disposed at the downstream side in the direction in which the paper 31 is conveyed when viewed from the secondary transfer position T5. A belt cleaner 34 is provided at a position opposite to the drive roller 26 across the intermediate transfer belt 19. The belt cleaner 34 can contract with the intermediate transfer belt 19, and can be separated from the intermediate transfer belt 19.

An LED (Light Emitting Diode) light source 35 and a photodiode 36 are provided between the primary transfer position T4 of the fourth station and the secondary transfer position T5. The LED light source 35 and the photodiode 36 constitute a photosensor. The photosensor is a detection section to detect densities of patch pattern images formed on the photoconductive drums 22a, 22b, 22c and 22d by the image formation process section 20 based on image data of plural patch patterns generated from fixed values.

The photosensor detects reflected light amounts of the toner patch patterns formed on the intermediate transfer belt 19. The photosensor inputs the detected data of the reflected light amounts to the image processing section 14.

Further, a not-shown fixing roller and pressure roller are provided at a downstream side in the conveyance direction of the paper 31 when viewed from the secondary transfer position T5. The temperature of the fixing roller is raised up to about 180° C. A recording member such as the paper 31 on which the toner image is transferred passes through between the fixing roller and the pressure roller, so that the toner image is fused and the toner is fixed to the recording member. The recording member is printed out.

An image quality maintaining control operation of the image processing section 14 provided in the color copier 1 will be described.

In the image quality maintaining control method by the image processing section 14, the image processing section 14 executes an initial image quality adjustment process at the installation or the like of the color copier 1, and after the color copier 1 starts to operate, the image processing section 14 executes a normal image quality adjustment process. Besides, when the image processing section 14 executes the normal image quality adjustment process, the image processing section 14 uses fixed values as input values of development patches formed on the photoconductive drums 22a to 22d.

The initial image quality adjustment process includes a first process in which the image processing section 14 obtains a gradation correction characteristic by using gradation pattern images formed on the paper 31 by the image forming sections 21a to 21d, and a second process in which the image processing section 14 obtains a gradation correction characteristic by using development patches (patch pattern images) formed on the photoconductive drums 22a to 22d by the image forming sections 21a to 21d.

In the first process, the image reading section 10 reads the gradation pattern images formed on the paper 31. The image processing section 14 determines the gradation correction characteristic by using the read information, and holds the gradation correction characteristic in the LUT 33. The gradation correction characteristic at this time is made f(x).

In the second process, at a similar timing as the first process (immediately before the first process or immediately after the first process), the image forming sections 21a to 21d form two or more kinds of plural development patches on the photoconductive drums 22a to 22d. The image reading section 10 reads patch densities. The image processing section 14 determines a gradation characteristic from the patch densities, determines the gradation correction characteristic from the gradation characteristic, and holds the gradation correction characteristic in the LUT 33. The gradation correction characteristic at this time is made g(x), and the gradation characteristic is made $g^{-1}(x)$.

In the normal image quality adjustment process, the image forming sections 21a to 21d form the same plural development patches as the plural development patches formed in the initial image quality adjustment process on the photoconductive drums 22a to 22d. The photosensor reads patch densities. The image processing section 14 determines a gradation characteristic from the patch densities, and determines a gradation correction characteristic g'(x) from the gradation characteristic. The image processing section 14 calculates a difference between g'(x) and the gradation correction characteristic g(x) in the LUT 33, and holds the difference in the LUT 33. A difference gradation correction characteristic at this time is made g"(x).

When the difference gradation correction characteristic g"(x) is small, the image processing section 14 sets g"(x)=1.

The image processing section 14 calculates f(x)*g"(x), and performs image formation while using f(x)*g"(x) as the correction characteristic.

Hereinafter, a more detailed description will be made.

The initial image quality adjustment process will be described.

When the color copier 1 is installed and power is first turned on to the color copier 1, the image processing section 14 causes an operation panel of the color copier 1 to display a message to urge execution of automatic gradation correction. Alternatively, when a fixed number of recording members are printed out, or at a timing requested by the user, the operation panel is made to display the same message.

Figure 2A:
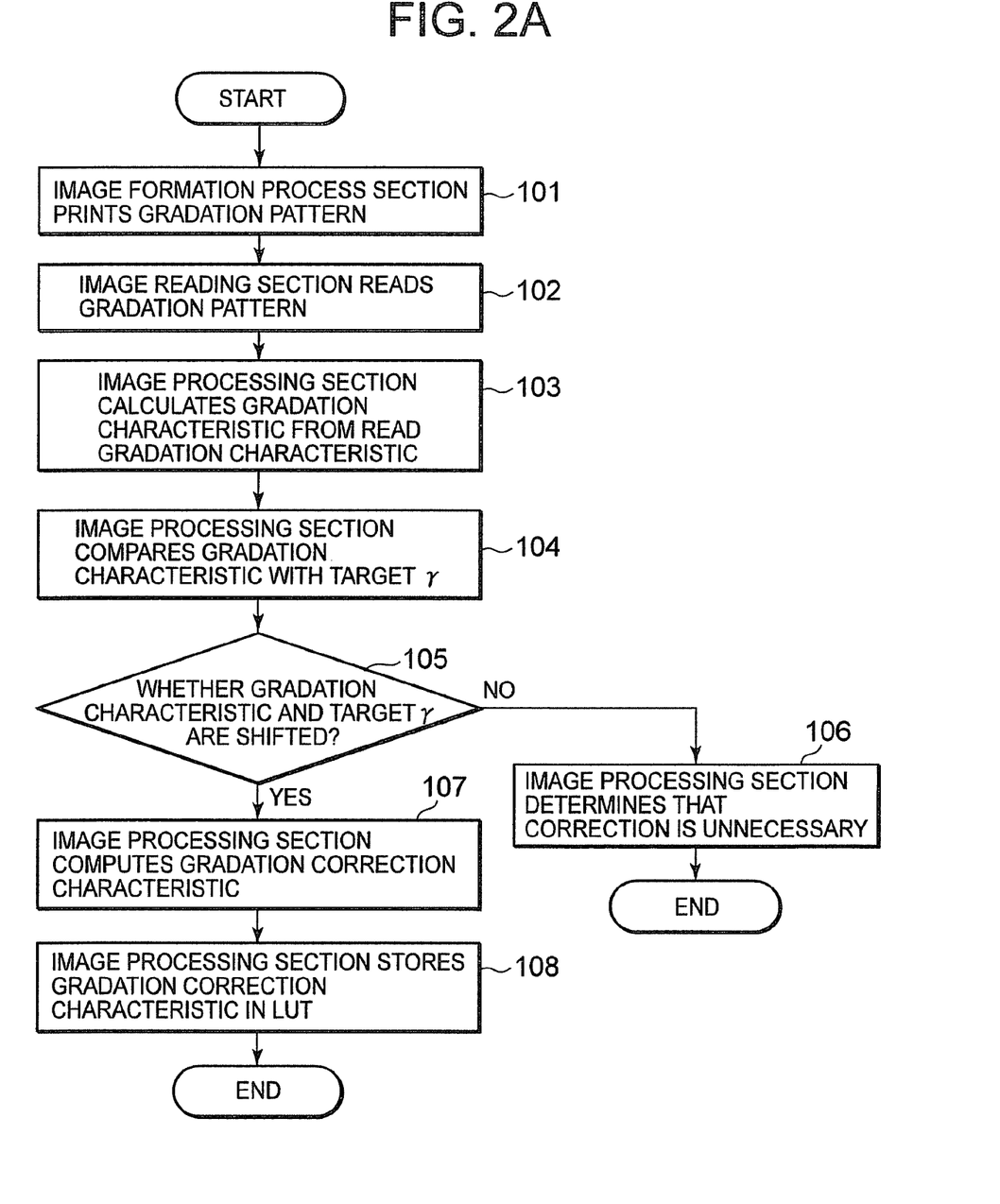
FIG. 2A is a flowchart for explaining a first process of an image quality maintaining control operation using an image forming method of a first embodiment.
Figure 3:
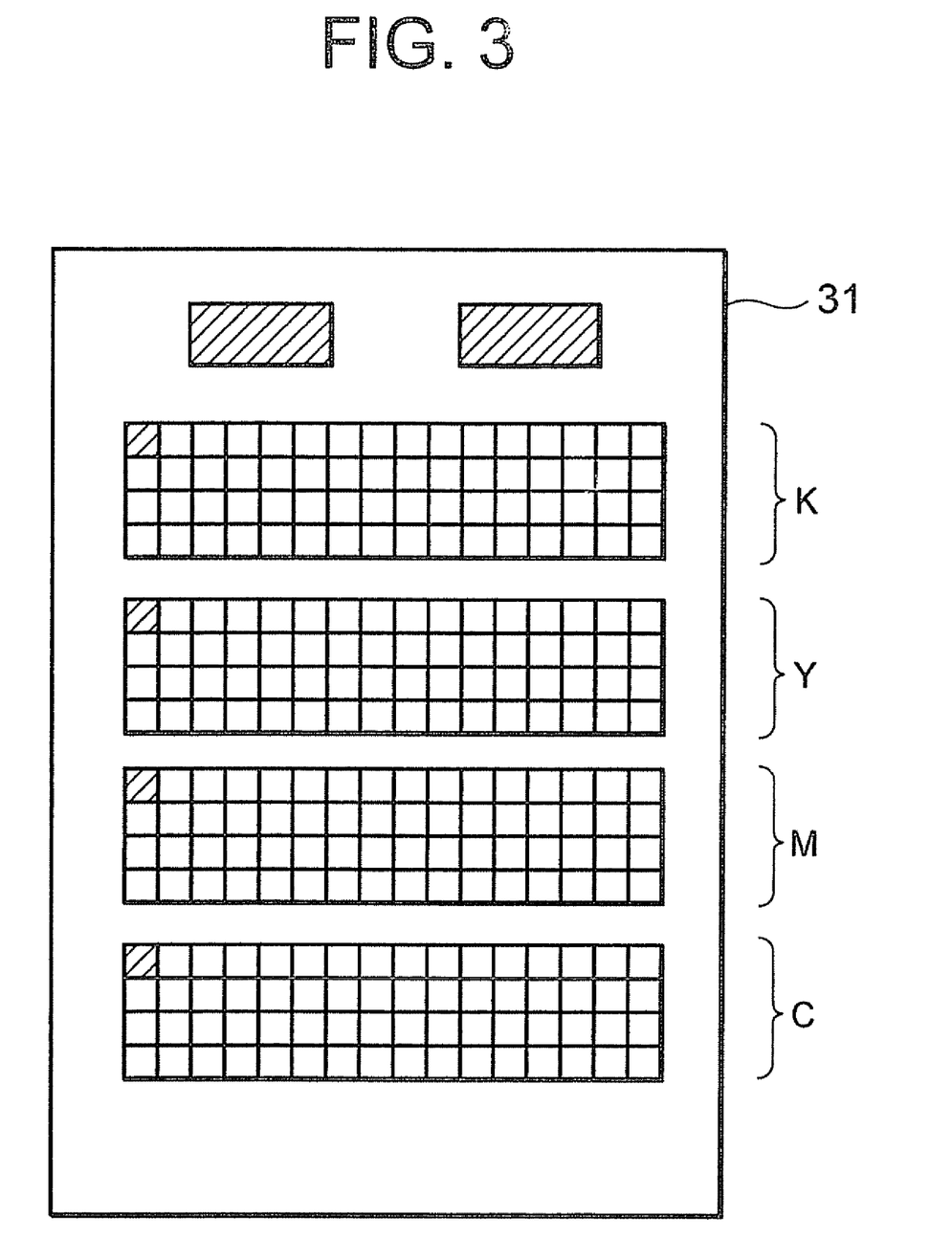
FIG. 3 is a view showing a 64-gradation pattern printed in the image quality maintaining control operation using the image forming method of the first embodiment.

FIG. 2A is a flowchart for explaining the first process of the image quality maintaining control operation by the image processing section 14. When the user operates a panel key for executing the automatic gradation correction in accordance with the display content, at Act 101, the image formation process section 20 prints pattern patches of 64 gradations including 16 gradations for each of four colors of CMYK on the paper 31 as shown in FIG. 3. A dense color portion in the figure represents a solid image.

The user puts the paper 31 on which the images of the pattern patches are formed onto the platen glass 15 of the image reading section 10. The user operates the panel key in accordance with the message displayed on the operation panel. The image processing section 14 again starts execution of the automatic gradation correction.

At Act 102 of FIG. 2A, the image reading section 10 reads density values of the pattern patches of total 64 gradations for four colors of CMYK.

At Act 103, the image processing section 14 obtains a gradation characteristic of 255 gradations from the read density values by performing interpolation using, for example, cubic spline interpolation. The image processing section 14 holds a target gradation characteristic (hereinafter referred to as a target 7) as an initial value in the LUT 33.

At Act 104, the image processing section 14 compares the target γ with the gradation characteristic obtained at Act 103.

At Act 105, the image processing section 14 determines whether the gradation characteristic and the target γ are shifted from each other. At Act 105, when the image processing section 14 determines that the gradation characteristic and the target γ are not shifted from each other, the processing advances through No route, and at Act 106, the image processing section 14 determines that the gradation characteristic is equivalent to the characteristic of the target γ. In this case, the image processing section 14 determines that correction is unnecessary and ends the processing.

At Act 105, when the image processing section 14 determines that the obtained gradation characteristic is shifted from the target γ, the processing advances through Yes route, and at Act 107, the image processing section 14 computes a gradation correction characteristic. The image processing section 14 multiplies the gradation characteristic of the image formation process section 20 in the present state by a certain gradation correction characteristic, so that the gradation characteristic of the image formation process section 20 is corrected to the gradation characteristic equivalent to the target γ.

Figure 4:
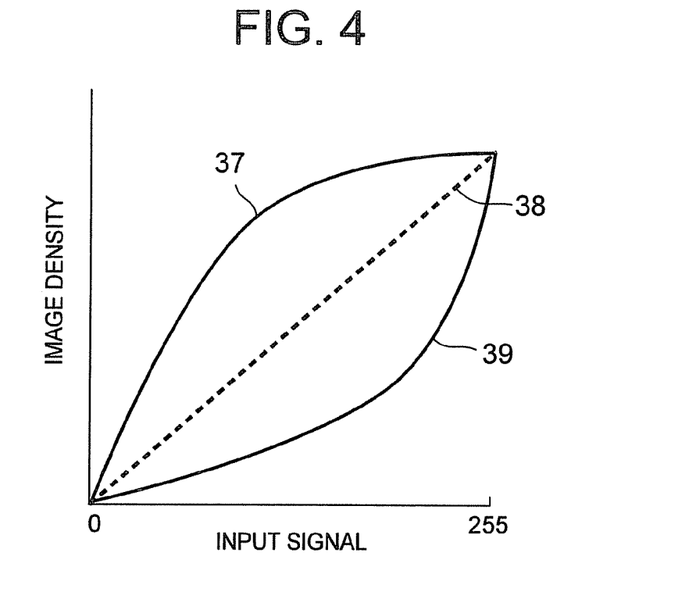
FIG. 4 is a view showing a correction table.

FIG. 4 is a view showing a correction table. The image processing section 14 computes an inverse characteristic of the gradation correction characteristic from a present gradation characteristic 37 of the image formation process section 20 and a target γ 38, and calculates to invert the resultant inverse characteristic with respect to the target γ 38, so that a gradation correction characteristic 39 is obtained.

At Act 108, the image processing section 14 stores the thus obtained gradation correction characteristic in the LUT 33. The above processing is the processing of the first process.

Next, the second process will be described.

Figure 2B:
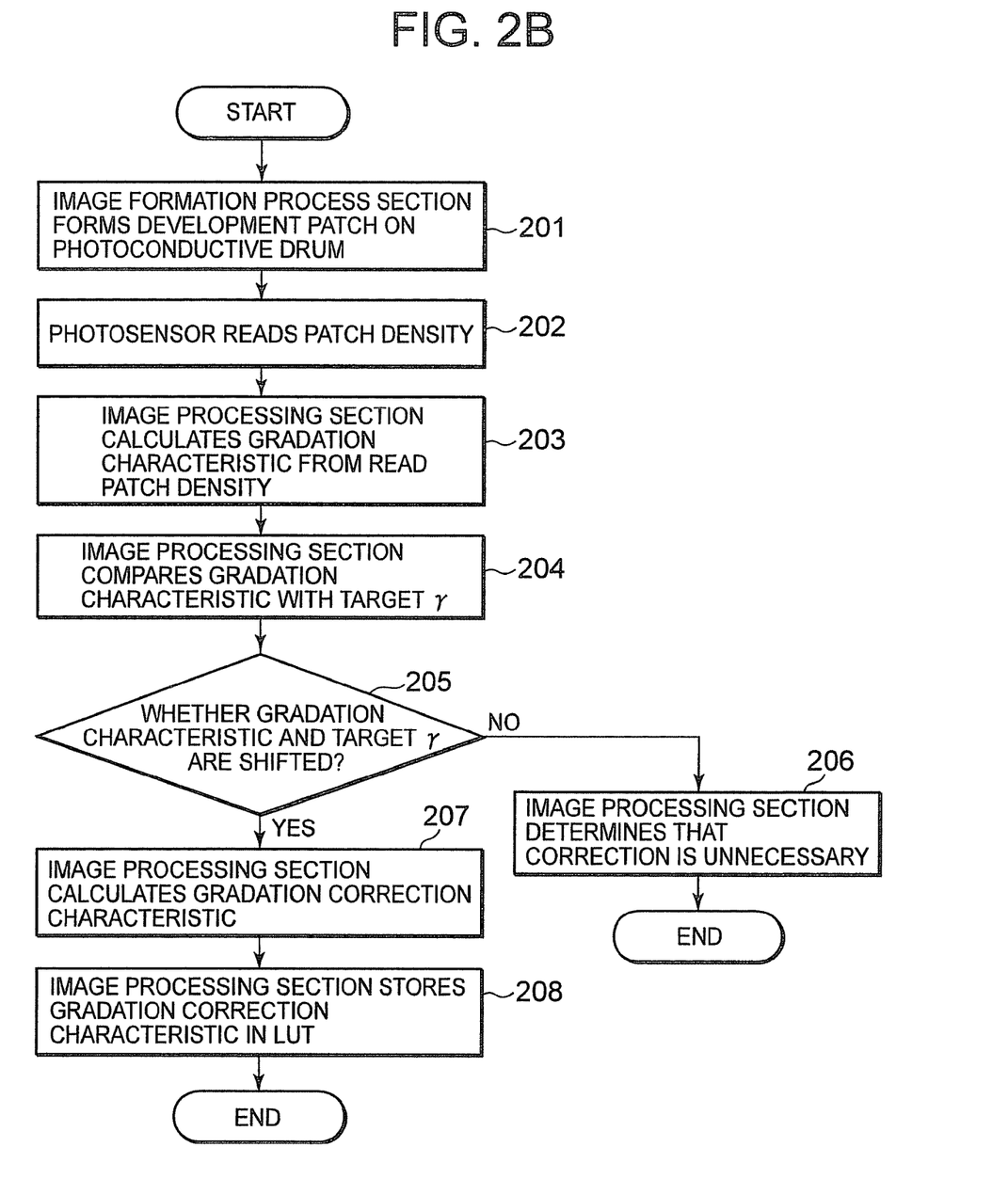
FIG. 2B is a flowchart for explaining a second process of the image quality maintaining control operation using the image forming method of the first embodiment.

FIG. 2B is a flowchart for explaining the second process of the image quality maintaining control operation.

Figure 5:
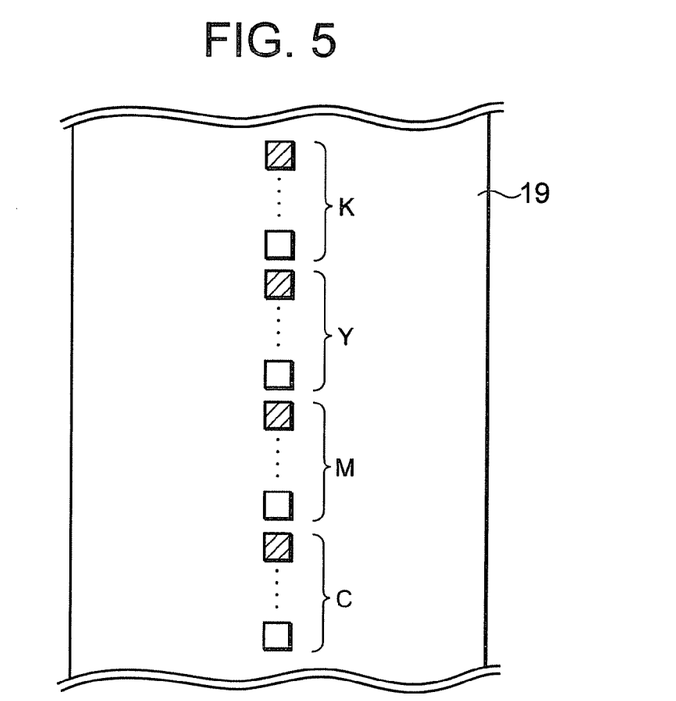
FIG. 5 is a view showing an example of a gradation patch formed on an intermediate transfer belt.

At Act 201, the image forming section 21a forms yellow 16-gradation pattern patches on the photoconductive drum 22a. FIG. 5 shows an example of the gradation patch formed on the intermediate transfer belt 19. At Act 201, the image forming sections 21b, 21c and 21d form 16-gradation pattern patches of magenta, cyan and black on the photoconductive drums 22b, 22c and 22d, respectively. At Act 201, the 16-gradation pattern patches of the four colors are transferred to the intermediate transfer belt 19 at the primary transfer positions T1, T2, T3 and T4, respectively.

At Act 202, the photosensor detects the respective density values of the respective 16-gradation pattern patches on the intermediate transfer belt 19.

At Act 203, the image processing section 14 calculates a gradation characteristic from the read patch densities. The image processing section 14 obtains the gradation characteristic from the detected density values by performing interpolation using, for example, cubic spline interpolation. Since the operation of from Act 201 to Act 203 is performed immediately before or immediately after the first process, the image processing section 14 should obtain the gradation characteristic equivalent to the gradation characteristic obtained in the first process.

Besides, at Act 204, the image processing section 14 compares the obtained gradation characteristic with the target γ similarly to the first process.

At Act 205, as a result of the comparison, when the gradation characteristic and the target γ are not shifted from each other, the processing advances through No route, and at Act 206, the image processing section 14 determines that correction is unnecessary, and ends the processing. At Act 205, when the obtained gradation characteristic is shifted from the target γ, the processing advances through Yes route, and at Act 207, the image processing section 14 computes a gradation correction characteristic.

Figure 6:
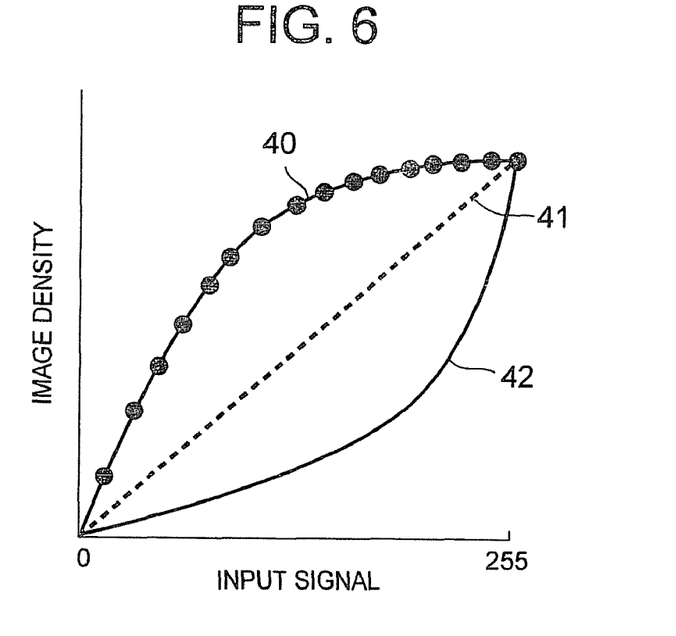
FIG. 6 is a view showing a gradation characteristic obtained by interpolation using the gradation patch and using the image forming method of the first embodiment.

FIG. 6 is a view showing the gradation characteristic obtained by the interpolation using the gradation patch. In the figure, 16 black dots represent 16 density patches. The image processing section 14 obtains a gradation characteristic 40 by interpolating the values of the 16 density patches. The gradation characteristic 40 shown in FIG. 16 is the characteristic for one color. The image processing section 14 forms a correction table for four colors and holds it.

At Act 207, when the gradation characteristic 40 is shifted from a target γ 41, the image processing section 14 computes an inverse characteristic of a gradation correction characteristic from the gradation characteristic 40 and the target γ 41. The image processing section 14 calculates to invert the resultant inverse characteristic with respect to the target γ 41, and obtains a gradation correction characteristic 42 of FIG. 6.

At Act 208, the image processing section 14 causes the LUT 33 to store the thus obtained gradation correction characteristic 42. The above processing is the processing of the second process.

The timing when the second process is executed is immediately before or immediately after the first process.

A description will be given to an operation of the image processing section 14 when the timing of the second process is immediately before the first process. As a preparation before the first process starts, warm-up is executed. In the middle of the warm-up, the temperature of the fixing roller is raised up to 180° C. In the middle of the warm-up, the image processing section 14 executes the second process. The image processing section 14 executes the second process before the first process starts, and therefore, the time required for the whole image quality maintaining control operation of the image processing section 14 can be shortened.

A description will be given to the operation of the image processing section 14 when the timing of the second process is immediately after the first process. In the first process, the image formation process section 20 prints the 64-gradation pattern patches. The original document on which the pattern patches are printed is scanned by the image reading section 10 through the user operation, so that the reading operation of the original document is performed.

The image processing section 14 starts the second process immediately after the printing of the pattern patches, and ends the second process before the scan operation starts. After the printing of the pattern patches is completed, the image processing section 14 completes the second process before the scan operation starts, so that the color copier 1 can shorten the whole time of the image quality maintaining control operation.

That is, even if the second process is executed immediately before the first process, or even if the second process is executed immediately after the first process, the efficiency of the image quality maintaining control operation can be improved. The image processing section 14 can complete the image quality maintaining control operation without generating a superfluous waiting time for the user.

The reference gradation characteristic $g^{-1}(x)$ is obtained by the first process and the second process.

Hereinafter, the image quality maintaining control operation at the normal image quality adjustment will be described. A description will be given to an image quality maintaining control operation executed by the image processing section 14 after the main power source is turned ON and after a certain period.

Figure 2C:
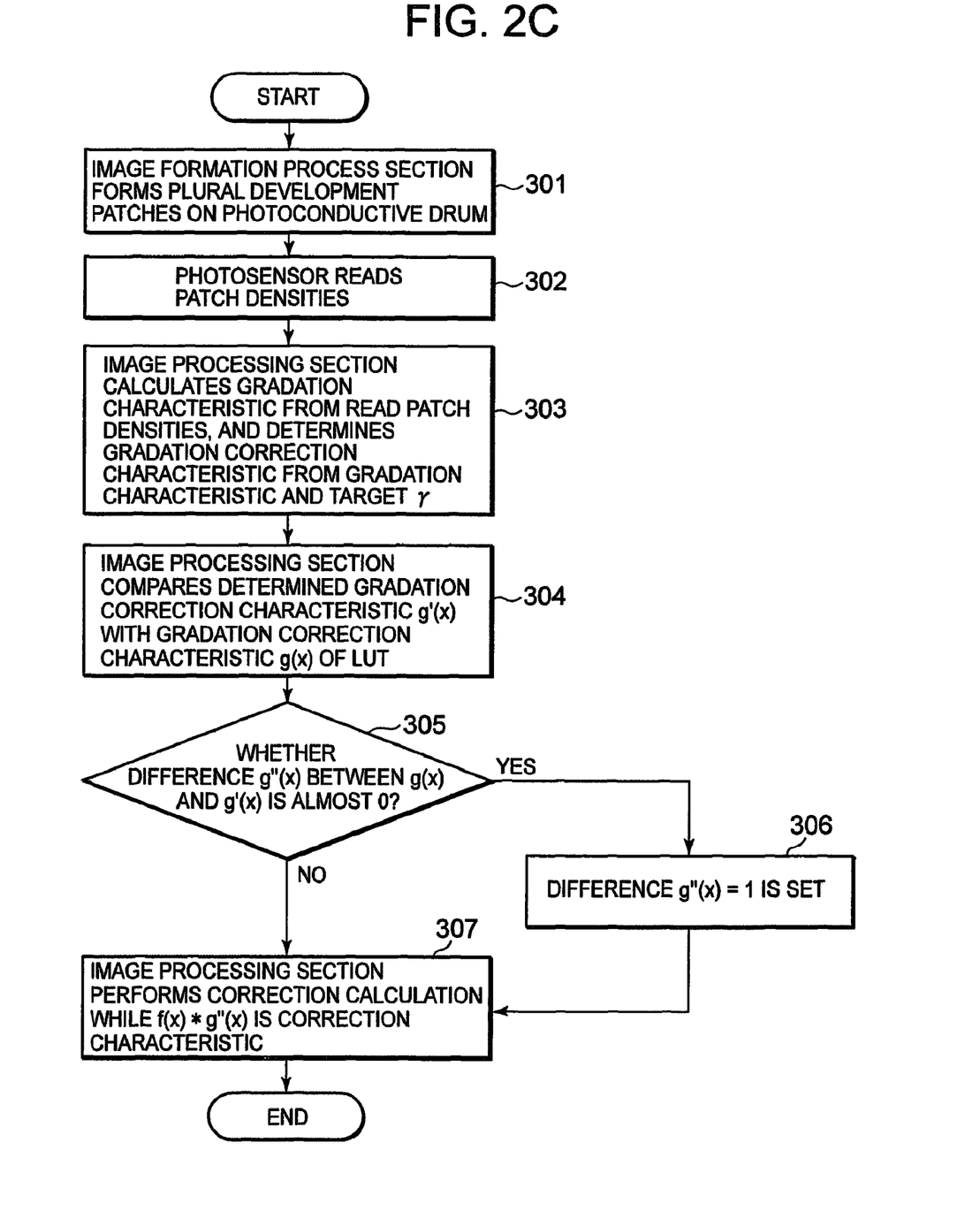
FIG. 2C is a flowchart for explaining the image quality maintaining control operation using the image forming method of the first embodiment.

FIG. 2C is a flowchart for explaining the image quality maintaining control operation.

After the main power source is turned ON or at a specified timing, the image processing section 14 starts a normal image quality adjustment processing (Act 301).

At Act 302, the image formation process section 20 forms 16-gradation pattern patches shown in FIG. 5 on the photoconductive drums 22a, 22b, 22c and 22d, respectively. The image processing section 14 previously stores data of 16-gradation pattern patches for the respective colors as reference data. The respective 16-gradation pattern patches are transferred to the intermediate transfer belt 19 at the primary transfer positions T1, T2, T3 and T4.

At Act 303, the photosensor detects the respective density values of the respective 16-gradation pattern patches on the intermediate transfer belt 19.

At Act 304, the image processing section 14 obtains a gradation characteristic from the detected density values by performing interpolation using, for example, cubic spline interpolation. At Act 304, the image processing section 14 computes an inverse characteristic of a gradation correction characteristic from the gradation characteristic obtained by the calculation of the image processing section 14 and the target γ held from the start. The image processing section 14 calculates to invert the resultant inverse characteristic with respect to the target γ, and obtains a gradation correction characteristic $g'(x)$.

Figure 7:
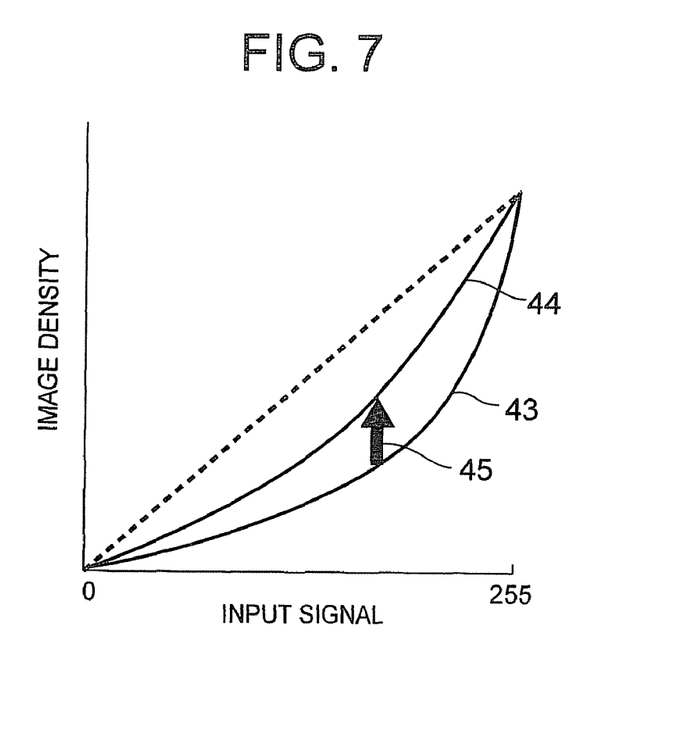
FIG. 7 is a view for explaining a difference.

At Act 305, the image processing section 14 compares the thus obtained gradation correction characteristic $g'(x)$ with the gradation correction characteristic $g(x)$ obtained in the second process and stored in the LUT 33. The image processing section 14 obtains a difference $g''(x)$ between the gradation correction characteristic $g'(x)$ and the gradation correction characteristic $g(x)$. FIG. 7 is a view for explaining the difference.

A gradation correction characteristic 43 shown in the figure is the gradation correction characteristic $g(x)$ obtained in the second process. A gradation correction characteristic 44 is the gradation correction characteristic $g'(x)$ obtained at Act 304. The image processing section 14 calculates the difference between the gradation correction characteristic 43 and the gradation correction characteristic 44.

At Act 305, the image processing section 14 determines whether the difference $g''(x)$ is almost 0. When the image processing section 14 determines that the difference $g''(x)$ is almost 0, the processing advances through Yes route. At Act 306, the image processing section 14 sets the difference $g''(x)$ to 1.

At Act 305, when the image processing section 14 determines that the difference $g''(x)$ is not almost 0, the processing advances through No route. At Act 307, the image processing section 14 multiplies the thus obtained difference $g''(x)$ by the gradation correction characteristic $f(x)$ obtained at the initial image quality adjustment. The image processing section 14 sets the obtained $f(x)*g''(x)$ to be a correction characteristic. The image processing section 14 rewrites the correction table by the correction characteristic $f(x)*g''(x)$.

Since the correction table is rewritten, when the gradation characteristic of the color copier 1 is shifted from the gradation characteristic at the installation of the color copier 1, the shift amount can be added to the gradation correction characteristic. Accordingly, the image processing section 14 can obtain the gradation property at the installation of the color copier 1.

When the value of the difference is sufficiently small, the gradation characteristic is hardly shifted, and the gradation correction is unnecessary. The image processing section 14 sets the difference value to 1. The image processing section 14 multiplies the difference value "1" by the gradation correction characteristic obtained in the first process, and can obtain the gradation property at the installation of the color copier 1.

In the image quality maintaining control operation of the first embodiment, the image processing section 14 performs the first process and the second process independently of each other, so that the efficiency of the image quality maintaining control operation can be improved. Besides, the gradation characteristic at the time of installation of the color copier 1 can be kept for a long period of time.

Hereinafter, a description will be given to a result of comparison between an operation time required for image quality maintaining control of the related art and an operation time required for the image quality maintaining control using the first embodiment.

(Operation Time T Required for the Image Quality Maintaining Control of the Related Art)

$T$=(warm-up)+(printing of gradation patch)+(reading by scanner)+(formation of LUT)+(formation of patch)+(detection by photosensor)+(formation of correction table)=20+5+10+5+5+5+5=55 sec.

(Operation Time T Required for the Image Quality Maintaining Control Using the First Embodiment)

$T$=(warm-up & formation of gradation patch & detection by photosensor)+(formation of correction table)+(printing of gradation patch)+(reading by scanner)+(formation of LUT)=20+5+5+10+5=45 sec.

55 sec−45 sec.=10 sec.

From the above, as compared with the image quality maintaining control operation of the related art, when the image quality maintaining control operation using the embodiment is performed, the time shortening of 10 seconds can be expected.

Second Embodiment

An image forming apparatus of a second embodiment is also a color copier. The image forming apparatus includes the same components as the components provided in the above color copier 1. Hereinafter, a description will be given to an image quality maintaining control operation by an image processing section 14 using an image quality adjustment method of the image forming apparatus of the second embodiment.

In the image quality maintaining control method of the image processing section 14, the image processing section 14 executes initial image quality adjustment at the time of installation of the color copier 1, and after the color copier 1 starts to operate, the image processing section 14 executes normal image quality adjustment. When the image processing section 14 executes the normal image quality adjustment, the image processing section 14 uses fixed values as input values of development patches formed on photoconductive drums 22a to 22d.

The initial image quality adjustment process includes a first process in which the image processing section 14 obtains a gradation correction characteristic by using gradation pattern images formed on a paper 31 by image forming sections 21a to 21d, and a second process in which the image processing section 14 obtains a gradation correction characteristic by using development patches (patch pattern images) formed on the photoconductive drums 22a to 22d by the image forming sections 21a to 21d.

The initial image quality adjustment process will be described.

When the color copier 1 is installed and power is first turned on thereto, the image processing section 14 causes an operation panel to display a message to urge execution of automatic gradation correction. Alternatively, when a predetermined number of recording members are printed out, or at a timing required by the user, the image processing section 14 causes the operation panel to display the same message.

The image processing section 14 performs the same first process as the example of FIG. 2A. The user operates a panel key for executing the automatic gradation correction in accordance with the display content. The image formation process section 20 prints pattern patches of total 64 gradations for four colors of CMYK as shown in FIG. 3.

The user puts the paper on which the pattern patch images are printed onto a platen glass 15 of an image reading section 10. The user performs an operation in accordance with the message displayed on the operation panel, so that the automatic gradation correction is again executed by the image processing section 14.

The image reading section 10 reads density values of the pattern patches of total 64 gradations for four colors of CMYK. The image processing section 14 obtains a gradation characteristic of 255 gradations from the read density values by performing interpolation using, for example, cubic spline interpolation. The image processing section 14 compares the obtained gradation characteristic with the target γ. As a result of the comparison, when the image processing section 14 obtains an equivalent gradation characteristic, the image processing section 14 does not perform correction.

When the obtained gradation characteristic is shifted from the target γ, the image processing section 14 multiplies the gradation characteristic of the image formation process section 20 in the present state by a gradation correction characteristic. The gradation characteristic of the image formation process section 20 is corrected to a gradation characteristic equivalent to the target γ by the multiplication. The image processing section 14 obtains the gradation correction characteristic used for the multiplication in the same way as the gradation correction characteristic 39 of FIG. 4.

The image processing section 14 computes an inverse characteristic of the gradation correction characteristic from the gradation characteristic 37 of the present image formation process section 20 and the target γ 38. The image processing section 14 calculates to invert the resultant inverse characteristic with respect to the target γ 38, and obtains the gradation correction characteristic 39 to be multiplied. The image processing section 14 stores the thus obtained gradation correction characteristic 39 in the LUT and the first, process is ended.

Hereinafter, the second process will be described.

Figure 10A:
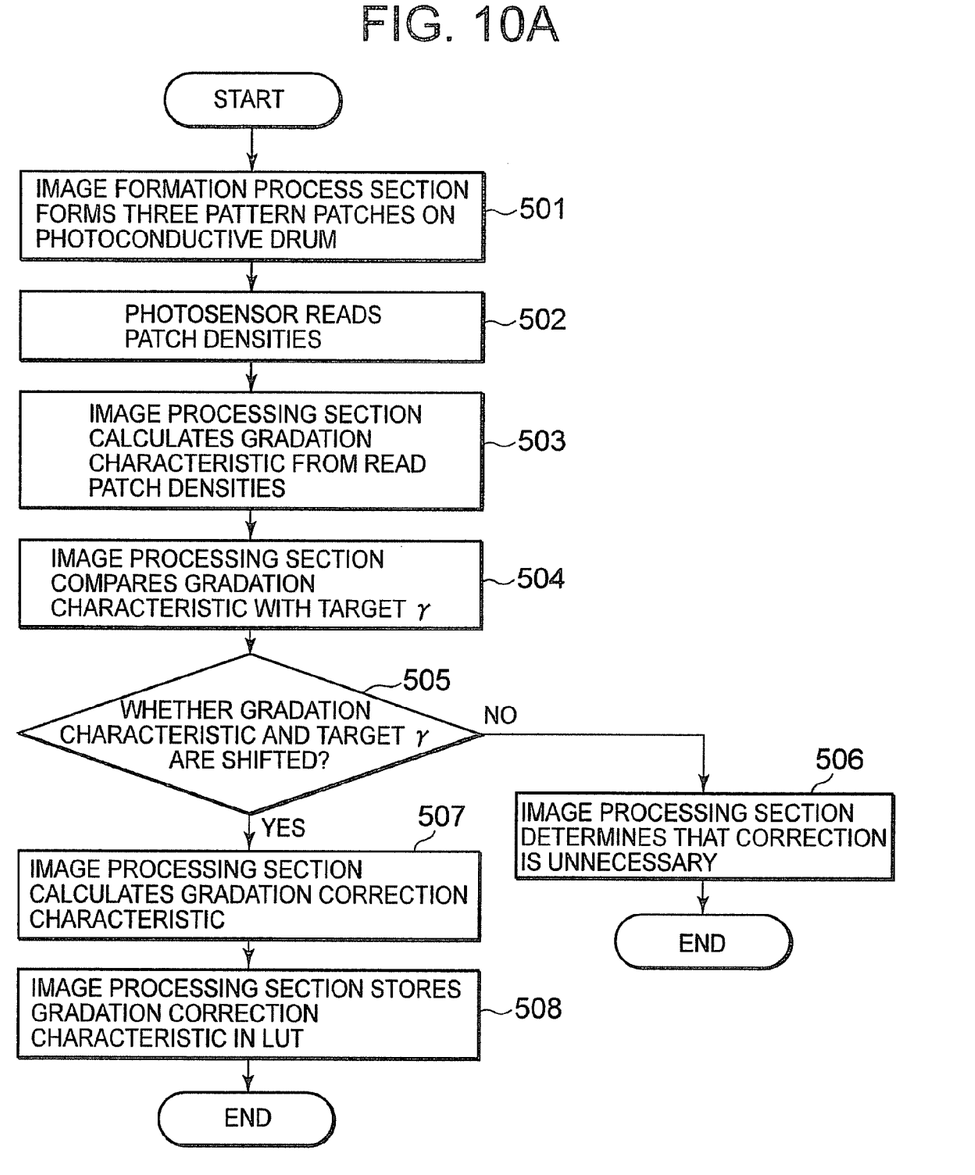
FIG. 10A is a flowchart for explaining a second process of an image quality maintaining control operation using the image forming method of the second embodiment.

FIG. 10A is a flowchart for explaining the second process of the image quality maintaining control operation. At Act 501, the image formation process section 20 forms three patches on the photoconductive drums 22a to 22d immediately before or immediate after the operation of the automatic gradation correction.

The image forming section 21a forms the three pattern patches formed from fixed input values on the photoconductive drum 22a. The three yellow patches are transferred to the intermediate transfer belt 19 at the primary transfer position T1. For example, when the maximum level of the input values is 255, the patches of patterns at three kinds of area ratios of 63, 127 and 255 are formed on the photoconductive drum 22a.

The area ratio represents the number of regions used for recording among plural regions obtained by dividing one pixel. The area ratio of 63, 127 or 255 represents that the ratio of the record region in one pixel is 63, 127 or 255.

Figure 8:
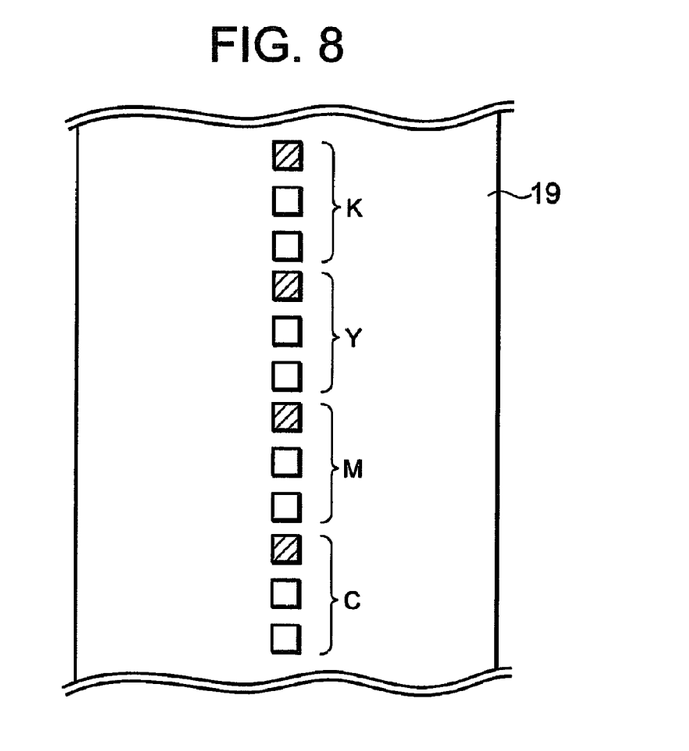
FIG. 8 is a view showing a gradation patch formed on an intermediate transfer belt using an image forming method of a second embodiment.

Besides, the image forming section 21b forms three magenta patches on the photoconductive drum 22b. The image forming section 21c forms three cyan patches on the photoconductive drum 22c. The image forming section 21d forms three black patches on the photoconductive drum 22d. FIG. 8 shows the gradation patches at the three kinds of area ratios for the respective colors on the intermediate transfer belt 19.

FIG. 8 is a view showing the gradation patches formed on the intermediate transfer belt 19 when the image forming method of the second embodiment is used. For example, the three gradation patches for black are the gradation patches of the area ratios of 255, 127 and 63 from above to below in the figure.

At Act 502 of FIG. 10A, the photosensor detects respective density values of the three pattern patches for each of the colors on the intermediate transfer belt 19.

At Act 503, the image processing section 14 obtains a gradation characteristic from the detected density values by performing interpolation. When the image processing section 14 performs the interpolation, the image processing section 14 uses a gradation characteristic shown in FIG. 9.

Figure 9:
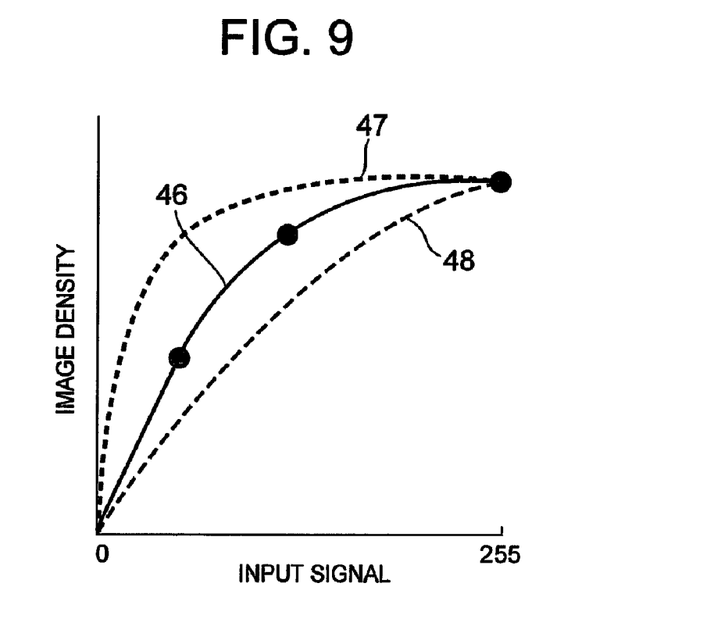
FIG. 9 is a view showing a gradation characteristic obtained by interpolation using the gradation patch and using the image forming method of the second embodiment.

FIG. 9 is a view showing the gradation characteristic obtained by the interpolation using the gradation patches when the image forming method of the second embodiment is used. Three black dots in the figure represent three density patches corresponding to the three kinds of area ratios. The image processing section 14 obtains a gradation characteristic 46 by interpolating the values of the three density patches. A correction table holding the gradation characteristic 46 is previously stored in the image processing section 14 or the color copier 1.

The image processing section 14 uses an upper limit curve 47 and a lower limit curve 48 for the gradation characteristic 46 and interpolates. The upper limit curve 47 and the lower limit curve 48 are also previously stored in the image processing section 14 or the color copier 1. Incidentally, the gradation characteristic shown in FIG. 9 is the characteristic for one color. The image processing section 14 uses the correction table for four colors.

Further, since the operation of the second process is immediately before the execution of the first process or immediately after the execution, when the second process is executed, the gradation characteristic equivalent to the gradation characteristic obtained in the first process should be obtained.

At Act 504 of FIG. 10A, the image processing section 14 compares the obtained gradation characteristic with the target γ. At Act 505, the image processing section 14 determines whether the gradation characteristic and the target γ are shifted from each other. When the gradation characteristic and the target γ are not shifted, the processing advances through No route, and at Act 506, the image processing section 14 ends the processing.

When the gradation characteristic is shifted, the processing advances through Yes route, and at Act 507, the image processing section 14 obtains a gradation correction characteristic. At Act 508, the image processing section 14 causes the LUT 33 to store the thus obtained gradation correction characteristic. With that, the second process is ended.

The reference gradation characteristic is obtained by the first process and the second process.

Hereinafter, the image quality maintaining control operation at the normal image quality adjustment will be described. A description will be given to the image quality maintaining control operation executed by the image processing section 14 after the main power source is turned ON and after a specific period.

Figure 10B:
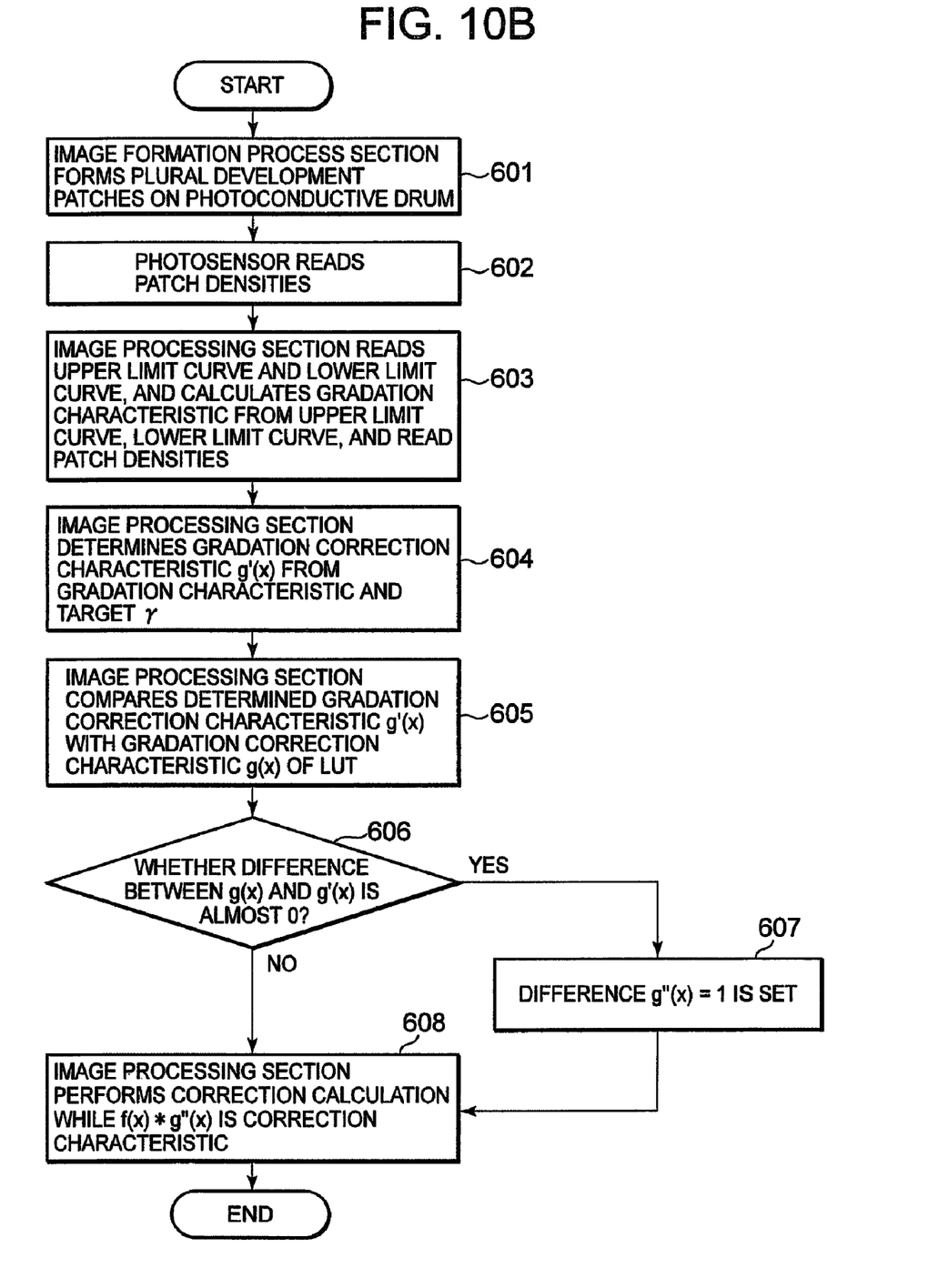
FIG. 10B is a flowchart for explaining the image quality maintaining control operation using the image forming method of the second embodiment.

FIG. 10B is a flowchart for explaining the image quality maintaining control operation.

At Act 601, the image formation process section 20 forms patches of patterns at three kinds of area ratios on the photoconductive drums 22a to 22d for the respective colors. The patches of the patterns at the three kinds of area ratios of 63, 127 and 255 are formed on the photoconductive drum 22a and the like.

Data of three pattern patches for the respective colors shown in FIG. 8 are previously stored as reference data in the image processing section 14. The three pattern patches for the respective colors are transferred to the intermediate transfer belt 19 at the primary transfer positions T1 to T4.

At Act 602, the photosensor detects the respective density values of the three pattern patches for the respective colors on the intermediate transfer belt 19.

At Act 603, the image processing section 14 reads the upper limit curve 47 and the lower limit curve 48 shown in FIG. 9 from the memory in the image forming apparatus. The image processing section 14 performs interpolation from the density values detected by the photosensor, the upper limit curve 47 and the lower limit curve 48, and computes a gradation characteristic.

Since the interpolation is performed using the upper limit curve 47 and the lower limit curve 48 previously stored in the image forming apparatus, the image processing section 14 can perform the interpolation by using only the density values of respective patches at input values of two points at minimum. The image processing section 14 can obtain the gradation characteristic 46 with high accuracy by the interpolation using only the two points.

That is, even if the number of patches is small, the color copier 1 can shorten the time of the image quality maintaining control operation without deteriorating the accuracy. Since the number of patches formed on the intermediate transfer belt 19 can be reduced, the image forming apparatus can also reduce the toner consumption.

At Act 604, the image processing section 14 computes an inverse characteristic of a gradation correction characteristic from the gradation characteristic obtained at Act 603 and the previously held target γ. The image processing section 14 calculates to invert the inverse characteristic with respect to the target γ and obtains the gradation correction characteristic g'(x).

At Act 605, the image processing section 14 compares the thus obtained gradation correction characteristic g'(x) with the gradation correction characteristic g(x) obtained in the in second process and stored in the LUT 33. The image processing section 14 obtains a difference g"(x) between the gradation correction characteristic g'(x) and the gradation correction characteristic g(x).

At Act 606, the image processing section 14 determines whether the difference g"(x) is almost 0. When the difference g"(x) is almost 0, the processing advances through Yes route, and at Act 607, the image processing section 14 sets the difference g"(x) to 1.

At Act 606, when the difference g"(x) is not almost 0, the processing advances through No route, and at Act 608, the image processing section 14 multiplies the thus obtained difference g"(x) by the gradation correction characteristic f(x) obtained in the first process. The image processing section 14 sets the obtained f(x)*g"(x) to be a correction characteristic. The image processing section 14 rewrites the correction table by the correction characteristic f(x)*g"(x).

Since the correction table is rewritten, when the gradation characteristic of the color copier 1 is shifted from the gradation characteristic at the time of installation of the color copier 1, the shift amount can be added to the gradation correction characteristic. Accordingly, the color copier 1 can obtain the gradation property at the time of installation of the color copier 1.

Besides, when the difference is sufficiently small, the gradation characteristic is hardly shifted, and the gradation correction is unnecessary. The image processing section 14 sets the difference value to 1 and multiplies the difference value by the gradation correction characteristic obtained in the first process, and can obtain the gradation property at the time of installation of the color copier 1.

In the image quality maintaining control operation of the image processing section 14 using the image forming method of the second embodiment, the number of patches required for the image quality maintaining control operation can be reduced without reducing the accuracy of the gradation characteristic obtained by the interpolation. The time of the image quality maintaining control operation can be shortened. The toner consumption can be reduced.

Hereinafter, a description will be given to a result of comparison between an operation time required for the image quality maintaining control operation of the related art and an operation time required for the image quality maintaining control operation using the second embodiment.

(Operation Time T Required for the Image Quality Maintaining Control Operation of the Related Art)

$T$=(warm-up)+(printing of gradation patch)+(reading by scanner)+(formation of LUT)+(formation of patch)+(detection by photosensor)+(formation of correction table)=20+5+10+5+5+5+5=55 sec.

(Operation Time T Required for the Image Quality Maintaining Control Operation Using the Second Embodiment)

$T$=(warm-up & formation of patch & detection by photosensor & formation of correction table)+ (printing of gradation patch)+(reading by scanner)+(formation of LUT)=20+5+10+5=40 sec.

55 sec.−40 sec.=15 sec.

From the above, as compared with the image quality maintaining control operation of the related art, when the image quality maintaining control operation using this embodiment is performed, the time shortening of 15 seconds can be expected.

In this way, according to the present invention, the time of the image quality maintaining control operation can be shortened. Besides, since the gradation correction characteristic with high accuracy can be obtained even by a small number of gradation pattern patches, the time of the image quality maintaining control operation can be further shortened.

Although exemplary embodiments of the present invention have been shown and described, it will be apparent to those having ordinary skill in the art that a number of changes, modifications, or alterations to the invention as described herein may be made, non of which depart from the spirit of the present invention. All such changes, modifications, and alterations should therefore be seen as within the scope of the present invention.

What is claimed is:

1. An image forming apparatus comprising:
    a gradation pattern generation section configured to generate gradation pattern data for plural gradation pattern images;
    an image forming section configured to form an image to be printed on a recording member, form any of the plural gradation pattern images having gradation on the recording member based on the gradation pattern data, and plural patch pattern images on an image carrier based on patch pattern data, the plural patch pattern images having fixed density values and being to be developed with toner;
    a reading section configured to read the gradation pattern images from the recording member and output density information of the gradation pattern images;
    a detection section configured to detect densities of the patch pattern images formed on the image carrier by the image forming section;
    a gradation correction characteristic generation section configured to generate a first gradation correction characteristic based on the density information outputted by the reading section and a previously held target gradation characteristic, store the first gradation correction characteristic in a storage section, generate a gradation characteristic from the densities detected by the detection section each time at respective different times, generate a second gradation correction characteristic from each generated gradation characteristic, and store the second gradation correction characteristics in the storage section;
    a calculation section configured to calculate a difference gradation correction characteristic indicative of a difference between the before-mentioned second gradation correction characteristic generated at initial image quality adjustment and the after-mentioned second gradation correction characteristic generated at normal image quality adjustment from the storage section; and
    an image quality maintaining control section configured to multiply the difference gradation correction characteristic calculated by the calculation section by the first gradation correction characteristic stored in the storage section, and perform gradation correction on image data for the image to be printed based on a third gradation correction characteristic obtained by the multiplication.

2. The apparatus of claim 1, wherein the detection section detects the densities of the patch pattern images on the image carrier based on the plural patch pattern images generated from fixed image input values of the first gradation correction characteristic.

3. The apparatus of claim 1, wherein the gradation correction characteristic generation section includes a memory to store an upper limit curve and a lower limit curve for determining whether the gradation characteristic is within a range between an upper limit gradation characteristic and a lower limit gradation characteristic, and performs interpolation using the densities detected by the detection section, the upper limit curve and the lower limit curve stored in the memory, and computes the gradation characteristic.

4. The apparatus of claim 1, wherein the gradation correction characteristic generation section stores the first gradation correction characteristic in the storage section and stores the second gradation correction characteristic in the storage section if the image forming apparatus is installed.

5. The apparatus of claim 1, wherein the reading section is a scanner to scan, an original document and to output a read image data.

6. The apparatus of claim 1, wherein after power is turned on to the image forming apparatus or a specific time measured by a CPU elapses, the image quality maintaining control section adjusts an image quality of the image on the recording member using the third gradation correction characteristic.

7. The apparatus of claim 1, wherein if a CPU detects a change in temperature measured by a temperature sensor or a change in humidity measured by a humidity sensor, the image quality maintaining control section adjusts an image quality of the image on the recording member using the third gradation correction characteristic.

8. An image quality adjustment method of an image forming apparatus, the method comprising the steps of:
reading plural gradation pattern images from a recording member on which the plural gradation pattern images are formed and outputting the density information of the gradation pattern images;
generating a first gradation correction characteristic based on the density information and a previously held target gradation characteristic and storing the generated first gradation correction characteristic in a storage section;
detecting, at initial image quality adjustment, densities of plural patch pattern images on an image carrier based on patch pattern data, the plural patch pattern images having fixed density values and being to be developed with toner;
generating a gradation characteristic from the densities to generate a second gradation correction characteristic from the generated gradation characteristic;
detecting, at normal image quality adjustment, densities of the patch pattern images formed on the image carrier;
generating other gradation characteristic from the densities to generate other a second gradation correction characteristic from thus generated gradation characteristic;
calculating a difference between the before-mentioned second gradation correction characteristic and the after-mentioned second gradation correction characteristic, and outputting a difference gradation correction characteristic including the difference;
multiplying the difference gradation correction characteristic calculated by the first gradation correction characteristic; and
performing gradation correction on image data for the image to be printed to adjust an image quality of the image on the recording member based on a third gradation correction characteristic obtained by multiplication.

9. The method of claim 8, wherein in detecting the densities, detecting the densities of the patch pattern images on the image carrier based on the plural patch pattern images generated from fixed image input values of the first gradation correction characteristic.

10. The method of claim 8, wherein in generating any of the gradation characteristic and other gradation characteristic, reading an upper limit curve and a lower limit curve from a memory to store the upper limit curve and the lower limit curve for determining whether the gradation characteristic is within a range between an upper limit gradation characteristic and a lower limit gradation characteristic, and performing interpolation using the densities, the upper limit curve and the lower limit curve, and computing the gradation characteristic.

11. The method of claim 8, wherein in generating the gradation correction characteristic and other gradation correction characteristic if the image forming apparatus is installed.

12. The method of claim 8, wherein in adjusting the image quality, after power is turned on to the image forming apparatus or a specific time measured by a CPU elapses.

13. The method of claim 8, wherein in adjusting the image quality, if a CPU detects a change in temperature measured by a temperature sensor or a change in humidity measured by a humidity sensor.

14. An image quality adjustment method of an image forming apparatus, the method comprising:
a first initial image quality adjustment step in which an image quality maintaining control section to perform gradation correction on image data for an image to be printed uses plural gradation pattern images having gradation on a recording member based on gradation pattern data and obtains a gradation correction characteristic;
a second initial image quality adjustment step in which the image quality maintaining control section uses plural first patch pattern images on an image carrier and obtains an initial time gradation correction characteristic; and
a normal image quality adjustment step in which the image quality maintaining control section obtains a normal time gradation correction characteristic by using plural a second patch pattern images having same patterns as the first patch pattern images formed in the second initial, image quality adjustment step, calculates a difference between the normal time gradation correction characteristic and the initial time gradation correction characteristic obtained in the second initial image quality adjustment step, and adjusts an image quality of the image formed on the recording member by using a difference gradation correction characteristic obtained by calculation and the gradation correction characteristic obtained in the first initial image quality adjustment step.

15. The method of claim 14, wherein the normal image quality adjustment step further comprises: a patch pattern image formation step in which the image forming section forms the second patch pattern images on the image carrier; a detection step in which a detection section to detect image density detects densities of the second patch pattern images formed in the patch pattern image formation step; and a characteristic generation step in which the image quality maintaining control section generates a gradation characteristic from the densities detected in the detection step and obtains the normal time gradation correction characteristic from the gradation characteristic.

16. The method of claim 15, wherein a timing if the second initial image quality adjustment step is executed is immediately before the first initial image quality adjustment step is executed or immediately after the first initial image quality adjustment step is executed.

17. The method of claim 14, wherein in the normal image quality adjustment step, the image quality maintaining control section multiplies the difference gradation correction characteristic by the gradation correction characteristic obtained in the first initial image quality adjustment step, and adjusts the image quality based on the third gradation correction characteristic obtained by the multiplication.

18. The method of claim 14, wherein in the normal image quality adjustment step, a CPU calculates an amount of the difference gradation correction characteristic calculated by the image quality maintaining control section, and the image quality maintaining control section determines based on the amount whether the image quality is to be adjusted.

19. The method of claim 18, wherein if a value of the amount calculated by the CPU is small, the image quality maintaining control section sets the difference gradation correction characteristic to a constant value.

20. The method of claim 14, wherein a timing if the second initial image quality adjustment step is executed is immediately before the first initial image quality adjustment step is executed or immediately after the first initial image quality adjustment step is executed.

* * * * *